March 27, 1962   R. E. POWERS ETAL   3,026,849
FLUID OPERATED VALVE FOR RELEASE OF FLUID UNDER PRESSURE
Filed March 14, 1958   2 Sheets-Sheet 1
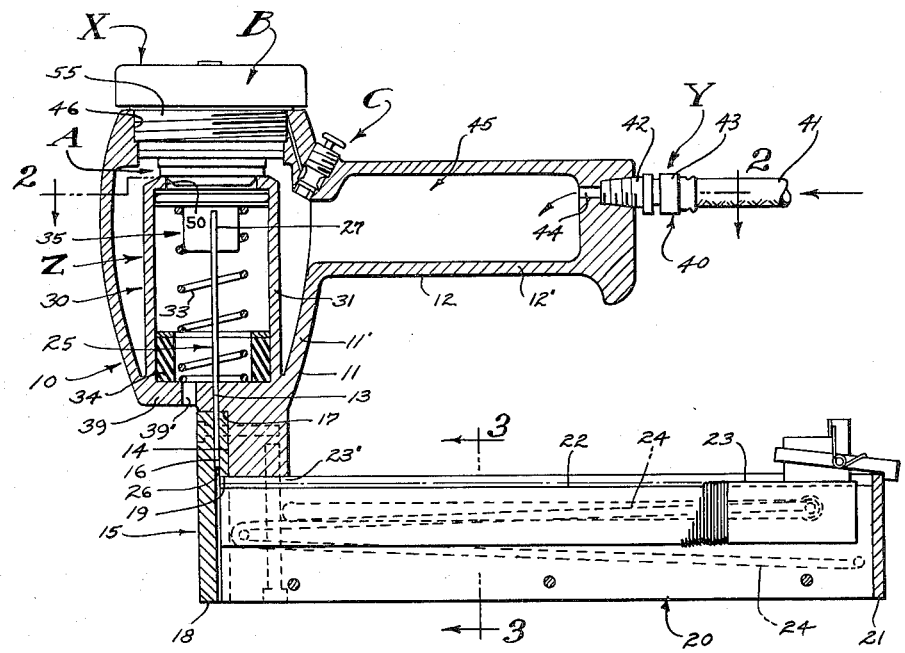
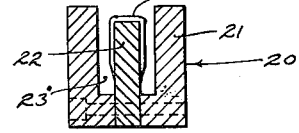
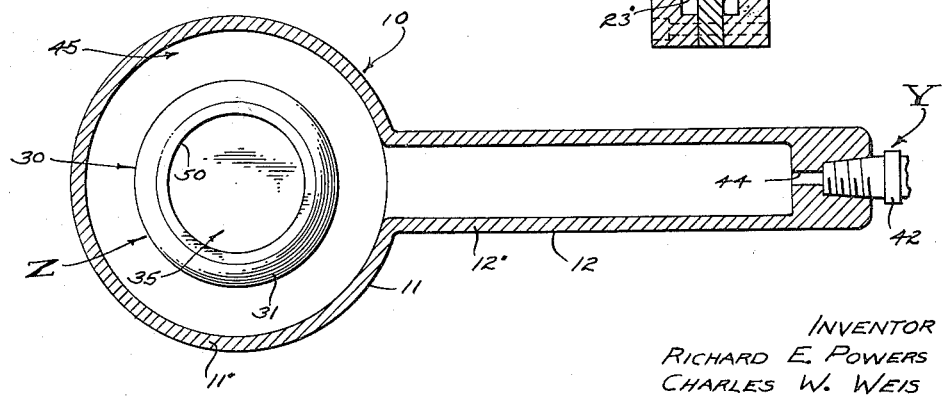
INVENTOR
RICHARD E. POWERS
CHARLES W. WEIS
AGENT

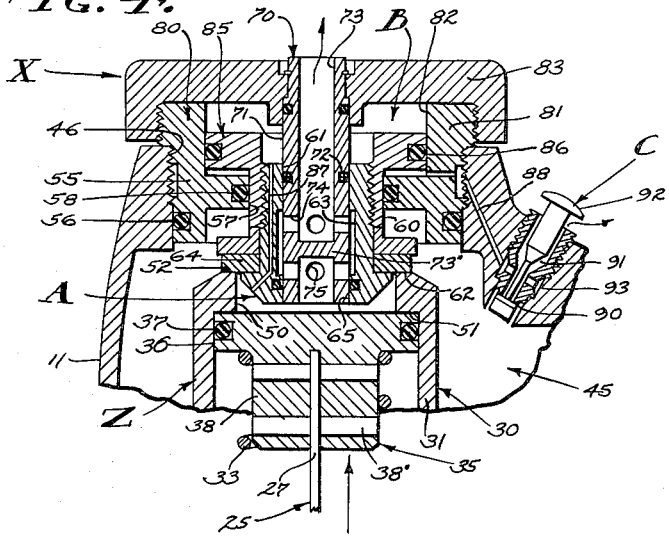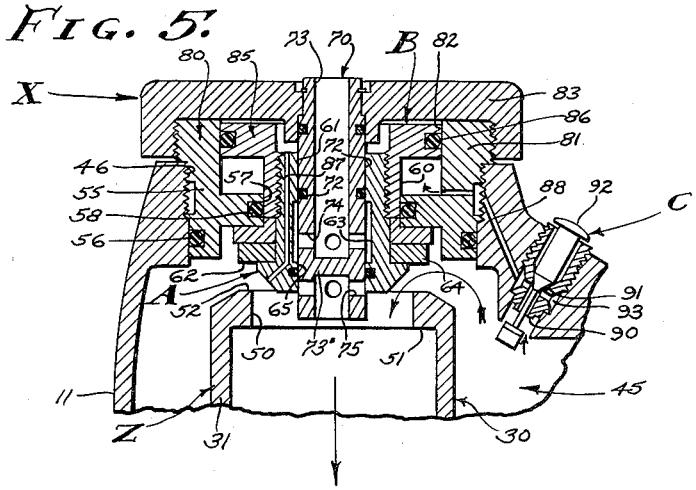

United States Patent Office 3,026,849
Patented Mar. 27, 1962

3,026,849
FLUID OPERATED VALVE FOR RELEASE OF FLUID UNDER PRESSURE
Richard E. Powers, Monterey Park, and Charles W. Weis, Arcadia, Calif., assignors to Powers Wire Products Company, Inc., Monterey Park, Calif., a corporation of California
Filed Mar. 14, 1958, Ser. No. 721,484
11 Claims. (Cl. 121—13)

This invention is concerned with a fluid operated valve for release of fluid under pressure and is particularly concerned with the release of fluid pressure supply to a device requiring fluid under pressure for its operation, it being a general object of this invention to provide a mechanism that controls the flow of a large volume of fluid under pressure and to direct it into a device to be used thereby.

The fluid operated latch, or valve mechanism, of the present invention is particularly adapted to use in fastener driving tools and it is, therefore, illustrated and described as it is applicable to a fastener driving tool, for example a staple driver, as shown. However, it is to be understood that the fluid operated latch, herein disclosed, is equally applicable to any similar situation involving the controlled admission of fluid into a device to be operated thereby.

Fluid actuated tools of the type under consideration commonly employ cylinder and piston drive motors that require the admission and exhaust of fluid for their operation. The particular tool illustrated in the drawings is a pneumatic tool for driving staples and the cylinder and piston motor is therefore air operated. In this type of tool there arises the problem of obtaining fast operation of the driving piston in order to obtain a forceful work stroke. Admission of air directly into the cylinder to operate the piston is not satisfactory since it results in slow acceleration of the piston due to the time factor involved in filling the cylinder with air from the air pressure supply. Various mechanisms have been employed and which result in fast acceleration of the piston, however, said mechanisms are not immediate acting in that they require time for air pressure to build up, and they are complicated and undesirable in that they involve numerous and critically formed parts.

An object of this invention is to provide a latch, or valve mechanism, for the release of fluid under pressure into a device to be operated thereby.

It is an object of this invention to provide a latch, or valve mechanism, for the control of fluid under pressure that is fluid operated, and wherein the fluid being handled thereby is also employed for the biasing of the moving element or elements involved.

An object of this invention is to provide a latch, or valve mechanism, of the character referred to that admits and also exhausts fluid under pressure from a fluid pressure operated device.

It is another object of this invention to provide a latch, or valve mechanism, for the release of fluid under pressure from a reservoir and directly into a fluid pressure operated device resulting in immediate and fast operation of said device.

It is still another object of this invention to provide a latch, or valve mechanism, of the type thus far referred to that involves few parts and which is highly effective in its operation. The present invention involves essentially but one working part or element that moves to gain the desired valving action. In addition to said working part there is merely a single moving part in the form of a valve element that is employed to trigger operation of the mechanism.

The various objects and features of this invention will be fully understood from the following detailed description of the typical preferred form and application of the invention, throughout which description reference is made to the accompanying drawings, in which:

FIG. 1 is a side sectional view of a fluid operated tool that incorporates the fluid latch of the present invention. FIG. 2 is an enlarged sectional view of the tool illustrated in FIG. 1 showing the air chamber that is formed therein and taken as indicated by line 2—2 on FIG. 1. FIG. 3 is a sectional view taken as indicated by line 3—3 on FIG. 1. FIG. 4 is an enlarged sectional view of a portion of the structure illustrated in FIG. 1 and showing the fluid operated latch, or valve mechanism, of the present invention, and showing said latch operated to retain fluid under pressure from entering the drive means of the tool. And, FIG. 5 is a view similar to FIG. 4 and showing said latch operated to release fluid under pressure to enter the drive means of the tool for operation thereof.

The fluid operated latch, or valve mechanism, of the present invention is shown incorporated in a pneumatic or air operated fastener driving tool that handles staples. The tool shown is in the form of a hand operated stapling gun, however, it is to be understood that the present invention is not limited to this particular kind of tool or device and may be employed in connection with any device that requires fluid pressure for its operation.

The tool, as illustrated in the drawings, is a hand tool and involves, generally, a frame 10 having a body portion 11 and a handle or grip portion 12, a head 15 carried by the frame 10 and adapted to direct fasteners into a piece of work, a magazine 20 for handling a supply of fasteners such as staples and cooperating with the head 15 so that the staples are received and handled by the head, a driver blade 25, and it involves the fluid operated latch, or valve mechanism, X that receives fluid under pressure from a fluid pressure supply Y to direct it to a drive means Z that actuates the driver blade 25.

The frame 10 carries the varoius elements of the tool and is shaped to be conveniently handled by a person, and involves, generally, the body portion 11 and the grip or handle portion 12. The body portion 11 is an elongate part having an opening 13 extending through the lower end thereof to pass the driver blade 25, and having a recess 14 at the opening 13 for receiving and positioning the head 15.

The handle or grip portion 12 is provided to give the person handling the tool a convenient means to hold the tool and is a simple grip of ordinarily construction that projects laterally of the frame 10. In practice, the grip 12 may be substantially normal to the axis of the body and may project therefrom as clearly shown in FIG. 1 of the drawings.

The head 15 is, in effect, an extension of the body portion 11 of the frame 10 and is provided to receive and deliver fasteners such as staples to the work being acted upon by the tool. The head 15 is carried by the frame 10 in the recess 14 and is provided with a longitudinal guideway 16 that extends through and opens at the ends of the head 15. The head 15 has a back portion 17 engaged with the seat 14, and it has a front face 18 engageable with the work to be acted upon.

The particular guideway 16 shown is adapted to handle staples S, or the like, that are U-shaped and formed of wire having a pair of sharpened ends (see FIG. 3). The staples referred to are substantially elongate with straight parallel shanks joined by a curved back. It will be apparent how the guideway 16 can be proportioned to pass the staples with clearance and deliver them from the front face 18 of the head 15. The guideway 16 is a continuation of the opening 13 that extends through the frame 10 to pass the driver blade 25.

A fastener or staple receiving opening 19 extends laterally through the head 15 which opening communicates with the guideway 16 so that staples S fed to the head 15 are properly guided and aligned with the guideway 16 before they are engaged by the driver blade 25.

The magazine 20 is adapted to handle and supply a stack of fasteners or U-shaped staples S and involves, generally, a case 21 carried by the frame 10, a guide 22 within the case 21, a follower 23 adapted to advance the fasteners or staples and a feed spring 24 yieldingly urging the follower toward the head 15. The case 21 is carried by the body portion 11 and is an elongate part that projects laterally of the frame 10. The case 21 is shell-like in form and the guide 22 is a core-like part that is coextensive with the case 21 and is carried between the side walls thereof. As shown, in FIG. 3 of the drawings, the case 21 and guide 22 are shaped so that a longitudinal passage 23 is formed, which passage conforms in general configuration to the U-shaped staples which are handled by the head 15.

The guide 22 enters the fastener or staple receiving opening 19 and terminates in a flat end that occurs in the plane of the wall of the guideway 16. The follower 23 conforms with the configuration of and is slidably carried in the passage 23 and is yieldingly urged toward the head 15 by the feed spring 24. Means is provided to prevent the follower 23 from entering the guideway 16.

The driver blade 25 is essentially a slender elongate part rectangular in cross sectional configuration and terminates at its forward end in a flat fastener or staple driving face 26. The upper end portion 27 of the blade 25 is anchored to a piston associated with the drive Z later described.

The drive means Z that is illustrated in connection with the particular tool under consideration is a typical cylinder and piston drive means, and it involves, generally, a cylinder 30 and a drive piston 35. The cylinder 30 is incorporated in the frame 10 of the tool and the piston 35 is shiftably operable within the cylinder 30. As shown, the cylinder 30 extends longitudinally of the tool and has a wall 31 substantially concentric with the driver blade 25 and with the opening 13 that extends through the lower end of the body portion 11 of the frame 10 to pass said blade. In practice, the cylinder 30 is formed, as by casting, integral with the frame 10 and projects upward from the lower end of the body portion 11 for reasons hereinafter described.

The piston 35 is a simple disc-shaped element slidably engaged with the cylinder wall 31, and it has a peripheral wall 36 with a seal 37 for engagement with said cylinder wall, and it has a depending coupler 38 that connects to the upper end portion 27 of the driver blade 25 to have driving connection therewith. The blade 25 is secured to the coupler as by pins 38' or the like.

Also included in the particular tool under consideration is a return means 33 for returning the piston 35 to the upper end of the cylinder 30, and a damper means 34 for snubbing the movement of the piston 35 at the lower end of the cylinder 30. The return means 33 is preferably in the form of a simple helical compression spring arranged between the piston 35 and the lower end of the cylinder or a part related thereto. The damper means 34 is preferably in the form of a compressible, or resilient, rubber bumper supported by the frame 10 at the lower end of the cylinder 30. As shown, the lower end of the cylinder 30 is closed by a head 39, there being a vent 39' of substantial capacity through the head 39 between the interior of the cylinder 30 below the piston 35 and the atmosphere surrounding the tool.

The fluid pressure supply Y in the particular tool under consideration is a pneumatic pressure supply such as is common to tools of the type illustrated. As shown, the supply Y involves a fluid connection 40 at the grip portion 12 of the frame 10. The connection 40 may include a flexible supply hose 41 joined to a suitable fitting 42 threadedly carried by the grip portion 12. The hose 41 may be joined to the fitting 42 by a quick disconnect 43, all to the end that air under pressure is communicated to a passage 44 entering the tool.

In accordance with the invention, the frame 10 is chambered in order to provide a reservoir 45 for the accumulation of a substantial volume of air under pressure. In carrying out the present invention, an ordinary air hose 41 is not of sufficient capacity to admit air to the tool in the quantity demanded for the desired operation thereof. Therefore, the reservoir is provided to accumulate the necessary quantity or volume of air required for operation of the tool, that is, for one complete cycle of operation thereof. However, it is to be understood that the fluid operated latch X herein disclosed is operable with or without a reservoir 45, for instance, the latch X is operable without the reservoir 45 in any instance where the fluid pressure supply is adequate by itself. In the particular case illustrated, the body portion 11 and grip portion 12 of the frame 10 are shell-like in form, having continuous imperforate walls 11' and 12'. As shown, the chamber of the reservoir 45 is in open communication with the passage 44 and surrounds the cylinder 30 which projects into the reservoir 45. The chamber of the reservoir 45 is accessible from the exterior of the tool through an opening 46 at the upper end of the frame 10, said opening 46 being aligned with the axis of the cylinder 30 and adapted to receive and carry the elements of the fluid operated latch X, as later described.

The fluid operated latch, or valve mechanism, X that is provided to receive fluid under pressure from the supply Y directs said fluid to the drive means Z for operation of the tool and so that the driver blade 25 is actuated to drive a staple S. In accordance with the invention the latch X involves, generally, a valve element A, a fluid operated means B for shifting the said valve element A, and a control means C for governing operation of the fluid operated means B. The valve element A is involved in the one movable part of the structure of the present invention and is provided to admit fluid into the cylinder 30 and to exhaust fluid therefrom. The fluid operated means B is also involved in the one movable part of the structure and is provided to shift the valve element between two positions, one where the supply of fluid is shut off from the cylinder 30 and fluid is exhausted therefrom, and the other where the supply of fluid is admitted to the cylinder 30 and the exhaust is closed. The control means C involves the only other movable part of the structure of the present invention and is provided to govern the action of the fluid operated means B that shifts the valve element A.

As shown throughout the drawings, the cylinder 30 is characterized by a fluid handling port 50 of substantial size, and in practice, the entire upper end of the cylinder 30 is open and forms the port 50. In order to limit upward travel of the piston 35 there is a shoulder 51 at the upper end of the cylinder in which case the port 50 is only slightly less in diameter than the bore of the cylinder 30. In accordance with the preferred form of the invention, the upper terminal end of the cylinder 30 is in a plane normal to the longitudinal axis thereof and forms a valve seat 52 to the end that the open upper end of the cylinder 30 is in open communication with the reservoir 45 when the valve element A is in the open position (see FIG. 5).

The valve element A that admits and exhausts fluid from the cylinder 30 is shiftably carried within the reservoir 45 to move relative to the seat 52 to open and close the port 50, and to close and open the exhaust means later described. In the preferred form of the invention a carrier 55 in the form of a valve guide and closure is provided to simultaneously shiftably carry the valve element A and to close the chamber of the reservoir 45. As shown, the carrier 55 is a circular disc-shaped element threadedly carried in the opening 46 at the upper end of the frame 10, closing the opening 46 and sealed with the frame 10 as by an O-ring type seal 56. A guide opening 57 extends through the carrier 55 on the extended central axis of the cylinder 30 to carry the movable part of the structure involving the valve element A and part of the operating means B. An O-ring type seal 58 is provided in the guide opening 57 to seal with the said shiftable part.

The valve element A is a disc-shaped element carried by a stem 60 that extends through the guide opening 57. In carrying out the invention the guide opening 57 is about but a little less than the diameter of the port 50 and the stem 60 is a tubular stem that passes through the opening 57 to operatively join the valve element A with the fluid operated means B. The inner wall 61 of the stem 60 slidably passes an exhaust tube 70 that is cooperatively related to the valve element A to exhaust fluid from the cylinder 30 when the element A is in the down or closed position (see FIG. 4).

The exhaust tube 70 is a stationary element that is carried by the head of the fluid operated means B later described and which depends from the head of said means B to be slidably engaged within the wall 61 of the stem 60. The tube 70 has a smooth exterior wall 71 with a seal 72 of the O-ring type engaged with the wall 61, and it has a central passage 73 therethrough opening to atmosphere at the upper end thereof and closed by a partition 73' at the lower end portion of the tube 70. There is a port 74 through the wall of the tube 70 above the partition 73' and there is a port 75 through the wall of the tube 70 below the partition 73'. As shown, the port 74 is in communication with the atmosphere surrounding the tool, while the port 75 is in communication with the interior of the cylinder 30 above the piston 35. The ports 74 and 75 are spaced apart longitudinally of the tube with the partition 73' occurring therebetween, and they are adapted to cooperate with the valve element A to control exhausting of fluid from the cylinder 30 to atmosphere.

The valve element A involves a face 62 engageable with the valve seat 52 and a recess 63 cooperating with the ports 74 and 75. The face 62 is a flat circular face preferably involving a body 64 of suitable sealing material. The valve element has a central bore 65 extending longitudinally therethrough on the central axis of the structure, said bore 65 being coincidental with the wall 61 in the stem 60 and slidably passing the tube 70. The recess 63 is formed in the bore 65 by an enlargement thereof and is of sufficient longitudinal extent to embrace the ports 74 and 75 when the elements are positioned as shown in FIG. 4 of the drawings, and when the elements are positioned as shown in FIG. 5 the ports 75 are cut off. It will be apparent how the valve element A when in the down position (FIG. 4) will close the port 50 and will open the ports 74 and 75, and it will be apparent how the valve element A when in the up position (FIG. 5) will open the port 50 and will close the ports 74 and 75.

The fluid operated means B that shifts the valve element A is supported by the carrier 55 and operates the element A by actuating the stem 60 that extends through the opening 57 in the carrier. The means B is in the nature of a motor and is preferably a cylinder and piston means that is operatively connected to the stem 60 to reciprocate the valve element A between the up and down positions shown in FIGS. 4 and 5, respectively. The fluid operated means B involves, generally, a cylinder 80 and a piston 85, the cylinder 80 being incorporated in the upper portion of the carrier 55, and the piston 85 being a portion of the movable part of the structure. As shown, the cylinder 80 has a wall 81 projecting upwardly from the carrier 55 and with a bore 82 formed concentrically with the central longitudinal axis of the structure. In carrying out the invention the bore is of substantially large diameter being greater in diameter than the port 50. A cylinder head 83 closes the top of the cylinder 80 and supports the exhaust tube 70 while the bottom of the cylinder 80 is closed by the carrier 55. The exhaust tube 70 is fixedly carried by the head 83 and is sealed therewith by an O-ring type seal.

The piston 85 is a disc-shaped element with an O-ring seal 86 slidably engageable with the bore 82 and adapted to be reciprocated upwardly and downwardly. As shown, there is a chamber formed in the cylinder 80 above the piston 85 and a chamber formed in the cylinder 80 below the piston 85, the chamber below the piston being of greater effective area than the effective area of the port 50. In accordance with the invention a by-pass 87 extends through the stem 60 between the chamber above the piston 85 and the interior of the cylinder 30 below the valve element A. Also, a fluid handling duct 88 extends through the carrier 55 and body 10 between the chamber below the piston 85 and the control means C.

The one moving part that is formed by the valve element A, piston 85 and the connecting stem 60 is a fabricated part made of essentially two pieces. The valve element A is embodied in one piece while the piston 85 is embodied in the other, said two pieces being secured together as by a threaded connection. In practice, the valve element A is formed with an extension that is threaded into the piston 85 and the by-pass 87 extends through the piece forming the valve element A. The body 64 of sealing material is held in place by a head on the valve element A and is backed up by a ring seated against a part of the piston 85 that extends through the guide opening to form the stem 60.

The control means C governs operation of the fluid operated means B by controlling the flow of fluid to and from the chamber below the piston 85 and through the duct 88. The control means C is a triggering means and involves a three-way valve controlling flow of fluid between the means B and the reservoir 45 and atmosphere. That is, in the unactuated position (FIG. 4) the means C is closed to the reservoir 45 and opens the means B to atmosphere, while in the actuated position (FIG. 5) the means C is opened to the reservoir 45 and is closed to atmosphere. The triggering valve of the means C involves, generally, a port and seat 90 in communication with the fluid under pressure in the reservoir 45, a port and seat 91 in communication with the atmosphere at the exterior of the tool, and a manually operable shiftable trigger 92 in the form of a plunger adapted to alternately open and close the ports and seats 91 and 92. The valve of the means C also includes a chamber 93 in communication with the ports 90 and 91, with the duct 88 to conduct fluid to and from the chamber below the piston 85. In practice, any suitable three-way valve of the type herein referred to may be employed.

From the foregoing, the operation of the fluid operated latch, or valve mechanism, will be apparent. When the tool is connected to a fluid pressure supply the reservoir is filled with fluid in a very short length of time after which the tool is ready to be triggered by manual operation of the control means C. Before triggering, however, the valve element A is held shut against the seat 52, as shown in FIG. 4, by fluid pressure within the reservoir 45 since the interior of the cylinder 30 is open to atmosphere through the tube 70. When the control means C is triggered by depressing the trigger 92 the port and seat 90 is opened between the reservoir 45 and lower end of the cylinder 80 causing the piston 85 to lift the valve element A off of the seat 52. At the slightest breaking or departure of the valve element A from the seat 52 the fluid pressure in the reservoir 45 acts beneath the valve element A to lift it rapidly to the position shown in FIG. 5 fully opening the port 52 and closing the exhaust tube 70. Upon release of the trigger 92 the fluid is exhausted from the lower end of cylinder 80 allowing the piston 85 to return to the position shown in FIG. 4, which is caused by fluid pressure within the tool that is communicated through the by-pass 87 to the upper end of the cylinder 80 to act upon the top of the piston 85 to move it downwardly. Thus, the tool is always ready for immediate use when the pressure supply Y is connected and when the trigger 92 is released.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A fluid operated valve for release of fluid under pressure from a supply thereof and including, a valve seat faced toward the fluid pressure supply, a valve element directly exposed to said fluid pressure and held in pressured engagement on the seat thereby, fluid pressure operated means operatively coupled to the valve element to lift said element off of the seat, and a control means alternately directing flow of fluid to said fluid pressure operated means from said fluid supply and exhausting flow of fluid from said fluid pressure operated means.

2. A fluid operated valve for release of fluid under pressure from a supply thereof and including, a valve seat faced toward the fluid pressure supply, a valve element directly exposed to said fluid pressure and held in pressured engagement on the seat thereby, fluid pressure operated means having a shiftable element to shift said element relative to the seat, said shiftable element defining separate chambers, and a control means alternately directing flow of fluid to one of said chambers from said fluid supply and exhausting flow of fluid from said chamber, and a fluid by-pass between the other chamber and the valve element.

3. A fluid operated valve for release of fluid under pressure from a supply thereof and including, a valve seat faced toward and exposed to the fluid pressure supply and surrounding a port, a shiftable valve element operable between two positions, one position where said element is held in pressured engagement on the seat by direct exposure to said fluid pressure and in which position it cooperates with an exhaust tube to exhaust fluid from the port, and the other position where said element is removed from the seat and cooperates with said tube to close the exhaust therethrough, fluid pressure operated means operatively coupled to the valve element to lift said element off of the seat, and a control means directing said fluid pressure to said fluid pressure operated means to lift the valve element.

4. A fluid operated valve for release of fluid under pressure from a supply thereof and including, a valve seat faced toward and exposed to the fluid pressure supply and surrounding a port, a shiftable valve element operable between two positions, one position where said element is held in pressured engagement on the seat by direct exposure to said fluid pressure and in which position it cooperates with an exhaust tube to exhaust fluid from the port, and the other position where said element is removed from the seat and cooperates with said tube to close the exhaust therethrough, fluid pressure operated means having a shiftable element to shift said element relative to the seat and to the tube, said shiftable element defining separate upper and lower chambers, and a control means alternately directing flow of fluid to said chambers from said fluid pressure supply, and a fluid by-pass between the upper chamber and the valve element at the port.

5. A fluid operated valve for release of fluid under pressure from a supply thereof and including, a body with a chamber therein supplied with fluid under pressure from said supply thereof, a port opening into said chamber, a seat surrounding said port and facing said fluid supply, a valve element directly exposed to said fluid pressure and held in pressured engagement on the seat thereby, fluid pressure operated means having a shiftable element to shift said element relative to the seat, said shiftable element defining separate chambers, and a control means alternately directing flow of fluid to one of said chambers from said fluid supply and exhausting flow of fluid from said chambers, and a fluid by-pass between the other chambers and the valve element at the port.

6. A fluid operated valve for release of fluid under pressure from a supply thereof and including, a body with a chamber therein supplied with fluid under pressure from said supply thereof, a port opening into and communicating with fluid pressure in said chamber, a fixedly positioned seat formed in the body and surrounding said port and facing said fluid supply, a shiftable valve element directly exposed to said fluid pressure and held in pressured engagement on the seat thereby, fluid pressure operated means having a shiftable element defining separate fluid handling chambers, a tube extending through the shiftable element of said means and cooperating with the shiftable valve element to exhaust fluid from the port when said element is on the seat, and a control means directing said fluid pressure to one of said chambers to shift the shiftable element to remove the shiftable valve element from the seat.

7. A fluid operated valve for release of fluid under pressure from a supply thereof and including, a body with a chamber therein supplied with fluid under pressure from said supply thereof, a port opening into and communicating with fluid pressure in said chamber, a seat surrounding said port and facing said fluid supply, a valve element directly exposed to said fluid pressure and held in pressured engagement on the seat thereby, fluid pressure operated means having a shiftable element defining separate fluid handling chambers, a tube extending through the shiftable element of said means and cooperating with the valve element to exhaust fluid from the port when said element is on the seat, a fluid by-pass between one of said chambers and the valve element at the port, and a control means alternately directing fluid pressure to the other of said chambers to shift the shiftable element to remove the valve from the seat and directing fluid pressure from said other chamber to atmosphere.

8. A fluid operated valve for release of fluid under pressure from a supply thereof and including, a body with a chamber therein supplied with fluid under pressure from said supply thereof, a port opening into said chamber, a seat surrounding said port and facing said fluid supply, an opening in the body and in substantial alignment with the port, a closure engaged in said opening and having a guide opening therethrough, a valve element carried on a stem extending through said guide opening and directly exposed to said fluid pressure and held in pressured engagement on the seat thereby, fluid pressure operated means having a shiftable element actuating the stem to shift the valve element relative to the seat, said shiftable element comprising the said closure and defining separate fluid handling chambers, and a control means directing said fluid pressure to one of said chambers to shift the closure comprising the shiftable element to remove the valve element from the seat.

9. A fluid operated valve for release of fluid under pressure from a supply thereof and including, a body with a chamber therein supplied with fluid under pressure from said supply thereof, a port opening into said chamber, a seat surrounding said port and facing said fluid supply, an opening in the body and in substantial alignment with the port, a closure engaged in said opening and having a guide opening therethrough, a valve element carried on a stem extending through said guide opening and directly exposed to said fluid pressure and held in pressured engagement on the seat thereby, fluid pressure operated means having a shiftable element actuating the stem to shift the valve element relative to the seat, said shiftable element defining separate fluid handling chambers, a tube extending through the shiftable element of said means and cooperating with the valve element to exhaust fluid from the port when the valve element is on the seat, and a control means directing said fluid pressure to one of said chambers to shift the shiftable element to remove the valve element from the seat.

10. A fluid operated valve for release of fluid under pressure from a supply thereof and including, a body with a chamber therein supplied with fluid under pressure from said supply thereof, a port opening into said chamber, a seat surrounding said port and facing said fluid supply, an opening in the body and in substantial alignment with the port, a closure engaged in said opening and having a guide opening therethrough, a valve element carried on a stem extending through said guide opening and directly exposed to said fluid pressure and held in pressured engagement on the seat thereby, fluid pressure operated means having a shiftable element actuating the stem to shift the valve element relative to the seat, said shiftable element defining separate fluid handling chambers, a tube extending through the shiftable element of said means and cooperating with the valve element to exhaust fluid from the port when the valve element is on the seat, a fluid by-pass between one of said chambers and the valve element at the port, and a control means directing said fluid pressure to the other of said chambers to shift the shiftable element to remove the valve element from the seat.

11. A fluid operated tool of the character described, a valve for release of fluid under pressure from a supply thereof to a fluid operated device, and including, a valve seat facing said fluid pressure supply and surrounding a port in communication with said device, a shiftable valve element operable between two positions, one position where said element is held in pressured engagement on the seat by direct exposure to said fluid pressure and in which position it cooperates with an exhaust tube to exhaust fluid from the port, and the other position where said element is removed from the seat and cooperates with said tube to close the exhaust therethrough, fluid pressure operated means operatively coupled to the valve element to lift said element off of the seat, and a control means directing said fluid pressure to said fluid pressure operated means to lift the valve element.

References Cited in the file of this patent

UNITED STATES PATENTS

| Number | Name | Date |
|---|---|---|
| 120,958 | Garland | Nov. 14, 1871 |
| 624,890 | Batchelor | May 9, 1899 |
| 2,291,619 | Grant | Aug. 4, 1942 |
| 2,677,933 | Hopkinson | May 11, 1954 |
| 2,683,580 | Griswold | July 13, 1954 |
| 2,687,522 | Juilfs | Aug. 31, 1954 |
| 2,821,170 | Jacobus | Jan. 28, 1958 |
| 2,854,953 | Osborne | Oct. 7, 1958 |
| 2,872,901 | Goldring et al. | Feb. 10, 1959 |
| 2,944,522 | Doyle | July 12, 1960 |

FOREIGN PATENTS

| 769,544 | Great Britain | Mar. 6, 1957 |